United States Patent
Pauls et al.

(10) Patent No.: US 6,750,265 B2
(45) Date of Patent: Jun. 15, 2004

(54) PREPOLYMER COMPOSTION FOR INSULATING FOAMS

(76) Inventors: Mathias Pauls, Mooshaldenstrasse, 9050 Appenzell (CH); Rene Schumacher, Stelzenrebenstrasse, 9403 Goldach (CH)

( * ) Notice: Subject to any disclaimer, the term of this patent is extended or adjusted under 35 U.S.C. 154(b) by 0 days.

(21) Appl. No.: 09/437,276

(22) Filed: Nov. 10, 1999

(65) Prior Publication Data

US 2003/0050357 A1 Mar. 13, 2003

Related U.S. Application Data

(63) Continuation of application No. 08/501,020, filed on Oct. 16, 1995, now abandoned, which is a continuation of application No. PCT/EP94/00385, filed on Feb. 10, 1994.

(30) Foreign Application Priority Data

Feb. 10, 1993 (DE) .......................... 43 03 848
Feb. 10, 1993 (DE) .......................... 43 03 849

(51) Int. Cl.$^7$ ............ C08J 9/14; C08G 18/42; C08G 18/76; C08K 5/521; C08K 5/5333
(52) U.S. Cl. ............ 521/107; 222/129; 252/182.2; 252/182.22; 521/108; 521/130; 521/131; 521/132; 521/137; 521/140; 521/159; 521/168; 521/172; 521/114
(58) Field of Search .............. 222/129; 252/182.2, 252/182.22; 521/107, 108, 114, 130, 131, 132, 137, 140, 159, 168, 172

(56) References Cited

U.S. PATENT DOCUMENTS

| | | | | |
|---|---|---|---|---|
| 3,442,827 | A | * | 5/1969 | Friedman .................... 521/159 |
| 4,035,313 | A | * | 7/1977 | Falkenstein et al. ......... 521/160 |
| 4,263,412 | A | * | 4/1981 | Pauls ......................... 521/114 |
| 4,508,244 | A | * | 4/1985 | Plaschka et al. .......... 222/153.1 |
| 4,651,899 | A | * | 3/1987 | Pauls et al. ................. 222/130 |
| 4,929,646 | A | * | 5/1990 | Nichols et al. ............. 521/137 |
| 5,079,270 | A | * | 1/1992 | Burkhart et al. ............ 521/117 |
| 5,614,566 | A | * | 3/1997 | Burkhart et al. ............ 521/132 |
| 6,054,499 | A | * | 4/2000 | Pauls et al. ................. 521/132 |
| 6,552,097 | B1 | * | 4/2003 | Pauls et al. ................. 521/114 |

* cited by examiner

Primary Examiner—Rabon Sergent
(74) Attorney, Agent, or Firm—Peters, Verny, Jones & Schmitt, L.L.P.; Howard M. Peters

(57) ABSTRACT

A prepolymer composition for producing polyurethane insulating foams with fire-retardant properties from pressure tanks which consists of a prepolymer component with at least one PU prepolymer with a content of NCO groups of 4 to 20 wt % and usual additives, as well as a propellant component, wherein the prepolymer component is substantially halogenfree and has 5 to 40 wt %, based on the prepolymer component, of softening phosphates and/or phosphonates with the formulae $O=P(OR_3)$ and $O=P(OR)_2R$.

12 Claims, No Drawings

US 6,750,265 B2

PREPOLYMER COMPOSTION FOR INSULATING FOAMS

RELATED APPLICATIONS

This application is a continuation of U.S. Ser. No. 08/501,020, filed Oct. 16, 1995, now abandoned, which is a Continuation of PCT/EP94/00385 filed Feb. 10, 1994, which have priority on DE applications German P43 03 849.2 filed Feb. 10, 1993 and German P43 03 848.4 filed Feb. 10, 1993.

BACKGROUND

This invention relates to a prepolymer composition for producing polyurethane insulating foams with fire-retardant properties from pressure tanks which consists of a prepolymer component with at least one PU prepolymer with a content of NCO groups of 4 to 20 wt % and usual additives as well as a propellant component. The invention furthermore relates to the use of softening phosphates and phosphonates as a firetardant additive to prepolymer compositions for producing pressure-can polyurethane insulating foams, as well as to pressure cans with such a prepolymer composition for producing polyurethane insulating foams.

The inventive prepolymer composition is used for producing polyurethane insulating foams which are used particularly for insulating purposes by foaming in cavities. The main areas of application are the construction industry, but also technical products in which cavities must be filled to avoid condensation nests. When one-component polyurethane foams are spoken of, these are applied by discharging the prepolymer composition from pressure tanks, for example aerosol cans, on the spot with the help of propellants with a bulk density of 10 to 50 g/l, and processed. One component foams are moisture-hardening, i.e. they can be cured solely with the help of the moisture contained in the air.

Two component polyurethane foams require a second hydroxy component for curing the prepolymer composition, generally as a polyol which must be added directly before foam formation. Curing can be accelerated by catalysts. Bulk densities in two component foams are characteristically 10 to 100 g/l.

Transitional forms between one component (1C) and two component (2C) hereinafter (1C) and (2C)) foams are possible. In this case a quantity of a hydroxyl component insufficient for reacting the isocyanate groups is added to the prepolymer before discharge. Such "transitional foams (hereinafter referred to as 1.5C foams or 1.5C)" are also covered by the invention.

Conventional prepolymer compositions for 1C and 2C polyurethane insulating foams contain a prepolymer component having a minimum content of reactive NCO groups. The prepolymer itself is a polymer of suitable viscosity with terminal NCO groups. Suitable isocyanates are for example isophorone diisocyanate, referred to as IPDI, tolylene diisocyanate, also referred to as TDI, diisocyanatotoluene, 1,5-diisocyanatonaphthalene, referred to as NDI, triisocyanatotrimethylmethane, 1,6-diisocyanatohexane, referred to as HDI, or 4,4diisocyanatodiphenylmethane in a raw and pure form or as a mixture. An especially common one is 4,4-diisocyanatodiphenylmethane, also referred to as MDI, which is used both in a raw form (raw MDI) and in the form of pure 2,4- and 4,4-isomers or mixtures thereof. One can likewise use the two common TDI isomers alone or in a mixture. For producing the prepolymer component one reacts such isocyanates with hydroxy polyethers, polyesters or polyvalent alcohols, making sure the prepolymer acquires a viscosity suitable for the composition.

Insulating foams to be wed in the construction industry, so-called B2 foams, must be set to be fire-retardant according to the national specifications. This is usually done by adding fire-retardant substances to the foaming materials, in particular chlorine- and bromine-containing organic compounds. Particularly well-known ones are chlorine and bromine derivatives from diphenyl ether and biphenyl, for example pentabromobiphenyl ether and polychlorinated biphenyls. Despite their excellent fire-retardant properties these substances have fallen into dispute for toxicological reasons. If their approval has not yet lapsed, there are phasing-out deadlines. In addition, packings containing foamer residues polluted with such fire-retardant substances are subject to cost-intensive restrictions on disposal. The same applies to the finished foams when they are no longer needed and must be removed.

The problem of the invention is therefore to provide a PU prepolymer which can be set to be fire-retardant without using conventional chlorine- and bromine-containing organic materials and is thus halogen-free in the prepolymer component.

This goal is achieved with a prepolymer composition of the abovementioned type wherein the prepolymer component is substantially halogen-free and has a content of 5 to 40 wt %, based on the prepolymer component, of softening phosphates and/or phosphonates.

The inventively applied phosphates and phosphonates have the general formulae $O=P(OR)_3$ and $O=P(OR)_2R$, wherein R can have different meanings in one and the same molecule and means alkyl, aryl, alkyl aryl or aralkyl with up to 10 C atoms.

The inventive prepolymer compositions generally contain a PU prepolymer based on known aliphatic and aromatic polyisocyanates and polyester polyols. It has turned out that particularly polyester polyols make a considerable contribution to the fire-retardant standardization of the inventive prepolymer compositions.

For producing the inventively applied prepolymer composition one uses conventional aliphatic and aromatic polyisocyanates. In particular one uses polyfunctional isocyanates with a mean of 2 to 4 isocyanate groups, both in monomeric and in oligomeric form. As stated at the outset, these pre-polymer compositions are themselves reaction products from monomers or oligomers containing isocyanate groups, and components reactive therewith, in particular hydroxyfunctional compounds. Suitable initial polyisocyanates are the ones mentioned at the outset and those stated for example in DE-A-42 15 647.

Especially suitable isocyanate prepolymers for these prepolymer compositions are ones based on HDI, MDI, TDI, NDI, 4,4-dicyclohexylmethanediisocyanate and PDI. The isocyanate prepolymers can be set to be low-monomer or substantially monomer-free. The NCO content in the applied prepolymer component is between 4 and 20 wt %, preferably between 6 and 18 wt % and in particular between 7 and 13 wt %.

When producing the isocyanate prepolymers one uses usual hydroxy components, for example polyether, polyester or modified vegetable oils with a sufficient hydroxyl number, approximately in the range of 100 to 300. Castor oil with a hydroxyl number of about 160 is suitable, as are usual glycols, in particular polyethylene glycols.

It is particularly suitable for inventive purposes to use polyesterols and native polyhydroxy compounds, which develop a synergistic effect with the inventively added softening phosphates and phosphonates. Polyester polyols that can be used are ones based on ethylene glycol or glycerine and aromatic or aliphatic, preferably native, polycarboxylic acids. These polyester polyols can be wholly or partly phosphorus-modified. Suitable polyester polyols have proved to be ones based on phthalic acid, isophthalic acid, terephthalic acid and adipic acid with molecular weights of 1000 to 2000, the polyol component being generally provided by glycols, glycerine and butanediols in a monomeric or oligomeric form. It is also suitable to use polyhydroxy compounds based on aliphatic fatty acids and suitable triglyceride derivatives, as are commercially available. The polyhydroxy compound applied in forming the prepolymer should have a hydroxy functionality in the range of 2 to 4.

The addition of a low quantity of polybutadiene makes it possible to improve the serviceability of the produced foams and obtain a fully foamable, dimensionally stable insulating material. Polybutadiene can be used in combination with PU prepolymers from all usual isocyanates, but is especially advantageous in combination with PU prepolymers based on HDI and MDI.

Suitable polybutadienes to be used are particularly liquid products as are offered by Hülls A G with a viscosity of at least 500 mPa.s at 20° C. Viscosity is preferably at least 2000 mPa.s at 20° C. and in particular about 3000 mPa.s at 20° C. An especially suitable liquid polybutadiene is sold under the designation Polyol 130 with about 75% 1,4-cis double bonds, about 24% 1,4-trans double bonds and about 1% vinyl double bonds and a molecular weight (vapor-pressure osmotic) of about 3000. The content of liquid polybutadiene according to the invention is 0.01 to 2 wt % and preferably 0.05 to 1 wt %, based on the prepolymer component to which it is added.

Suitable polybutadienes are furthermore those products of higher molecular weight which can be added to the prepolymer composition in a dissolved form or be dissolved therein. Also one can use higher-molecular polymeric hydrocarbons containing double bonds.

The molecular weight of suitable stabilizing additives is expediently 1000 to 9000, in particular up to 5000.

Along with pure (liquid) polybutadiene one can also use copolymers of 1,3-butadiene with other 1.3-dienes, for example isoprene, 2,3-dimethylbutadiene and piperylene, and with vinylaromatic compounds such as styrene, (α-methylstyrene, vinyl toluene and divinylbenzene. The content of comonomers in the copolymers should not exceed 50 mol %. Such copolymers are regarded as falling within the designation "(liquid) polybutadiene" if they are liquid or soluble.

It is assumed that the dimensionally stabilizing effect of polybutadiene is based on its ability to crosslink in the presence of oxygen.

If a monomer-reduced prepolymer is used it is obtainable for example by removing the monomer in a thin-layer evaporator. Alternatively or additionally one can react (residual) isocyanate monomer with a hydroxy polyether and/or polyester and/or modified vegetable oil. Suitable vegetable oils are ones with a hydroxyl number of 100 to 300, for example castor oil with a hydroxyl number of about 160. According to the invention it isreadily possible to obtain stable foams with such monomer-reduced prepolymer components, provided the polybutadiene is added. A prepolymer composition is termed low-monomer if it has less than 10% monomer, in particular less than 5% monomer; and substantially monomer-free if it has less than 2, preferably less than 1 and in particular less than 0.5 wt % monomer, always based on the prepolymer component, i.e. the reactive isocyanate-containing component present in the composition.

The prepolymer can contain usual additives, for example polysiloxanes for cell regulation, further usual flameproofing agents, softeners, catalysts, viscosity regulators, dyes, rheology-controlling additives and the like. The prepolymer composition, i.e. the PU prepolymer including all additives without propellants, expediently has an initial service viscosity at 20° C. of 5000 to 20000 mPa.s and preferably of 8000 to 15000 mPa.s. According to the invention the content of NCO groups in the PU prepolymer is 4 to 20 wt %, preferably 6 to 18 wt % and in particular 7 to 13 wt %, based on the prepolymer component.

To increase the fire-retardant effect of the insulating foams produced with the inventive prepolymer composition it may be expedient to add further flame-retardant additives which should also be free from chlorine and bromine in this case. It has proved particularly suitable to use melamine and melamine derivatives, for example melamine phosphate, dimelamine phosphate and melamine cyanurate, as well as cyanodiamide, dicyanodiamide, aluminum trihydrate, ammonium polyphosphate, in particular in a finely encapsulated form, and also red phosphorus. These agents are added in a finely divided form or as an emulsion. A wetting agent is generally likewise necessary for stabilizing the prepolymer composition. Conventional wetting agents can be used.

The inventive prepolymer composition contains in particular propane, butane and/or dimethylether as a propellant component. Further propellants that can be used in the component are fluorocarbons which are liquefiable under the pressure conditions prevailing in a pressure tank, for example R 125, R 134a, R 143 and R 152a. To minimize the content of combustible and halogen-containing propellants one can add further gases which are not condensable under the pressure conditions prevailing in the pressure can, for example $CO_2$, $N_2O$ or $N_2$—$CO_2$ is particularly preferred since it can partly dissolve in the prepolymer component and thereby contribute to foam formation, while also acting as a good propellant. If fluorine-containing propellants are dispensed with, the entire prepolymer composition can be set to be halogen-free.

The propellant component of this prepolymer composition expediently constitutes 5 to 40 wt %. The propellant content is 5 to 40 wt % of the prepolymer composition. The $CO_2$ content in the propellant can be for example about 5 wt %, based on the total propellant component. The content of gases not condensable under the prevailing pressure conditions should be such that the volume based on the empty space in the pressure tank yields a pressure of about 8 to 10 bars, depending on the relevant national specification for pressure tanks (aerosol cans). The empty space in the pressure tank is the space assumed by the uncondensed components of the prepolymer composition.

The liquid butadiene is optionally added to the prepolymer composition in solution along with an emulsifier for example in a weight ratio of 80/20-, preferably in solution with a hydroxy vegetable oil suitable for controlling the isocyanate content of the PU prepolymer. The liquid polybutadiene has a content of 0.01 to 2 wt % of the prepolymer composition. It has proven especially suitable to use castor oil with a hydroxyl number of 160, but any other hydroxy vegetable oils and hydroxy polyethers and polyesters can also be used. These are hydroxy components as are conventionally used for modifying viscosity in the formulation of prepolymer compositions.

The inventive prepolymer compositions can be used as 1C, 1.5C and 2C polyurethane foams. With 2C foams the polyol component required for curing the foam, and optionally a further component, are kept separate from the prepolymer composition in known fashion and added only directly before or during discharge. The corresponding methods are widely described and known to the expert, as are suitable two-component pressure cans with a separate tank for the second component.

The second component can be in particular usual polyols, in particular glycol, glycerine and butanediol. To accelerate the curing reaction it may be expedient to add to this second component a usual catalyst, for example tin dioctoate, cobalt naphthenate and octoate, dibutyl tin dilaurate, metallic, in particular ferrous, acetonylacetate, DABCO crystalline and N-methyl-2-azanorbornane. Further catalysts are triethylenediamine, trimethylamino ethyl-piperazine, pentamethyldiethylenetri amine, tetramethyliminobispropylamine, bis(dimethylaminopropyl)-N-isopropanolamine. It is also suitable to use heteroaromatic amines, as stated for example in DE-A-42 15 647.

The invention relates finally to the use of softening phosphates and phosphonates, as defined above, for setting polyurethane insulating foams to be fire-retardant. The invention also relates to pressure cans for discharging polyurethane insulating foams which are filled with a prepolymer composition and optionally a separate polyol component, as described above.

The inventive prepolymer compositions have the advantage that they can be produced substantially free from chlorine and bromine and can still be set to be fire-retardant without a need to add the usual halogen-containing flame-proofing agents. This means that the addition of flameproofing agents for B2 foams according to DIN 4102 can be largely or fully dispensed with. If necessary, the prepolymer compositions can also be set to be substantially halogen-free, i.e. one can dispense not only with halogen-containing flameproofing agents but also with fluorocarbons as propellants. In this case it is sufficient for the propellant component to contain propane, butane, dimethylether and/or $CO_2$.

It has turned out that these flame-retardant properties are due in particular to the trialkyl and triaryl phosphates and phosphonates. One can mention diphenylcresyl phosphate, triphenyl phosphate, tricresyl phosphate, triethyl phosphate, dimethylmethane phosphonate, diethylethane phosphonate and the like. One can further mention 2-ethylhexyldiphenylphosphate and phosphoric acid-1,3-phenylenetetraphenylester, which are commercially available under the designations Posflex 362 and Fyroflex RDP. Such phosphates and phosphonates are present in the prepolymer composition in a quantity of 5 to 40 wt %, based on the prepolymer. They have the advantage that they do not disturb the balance of prepolymer, propellant and thinners in the prepolymer composition but rather stabilize it, while conventional halogen-containing flameproofing agents interfere with this balance and can only be present with about 12 to 14 wt %. At the same time they have a softening function.

The inventive prepolymer composition is produced in the fashion known in the art, whereby if low-monomer prepolymer is used it is put in the pressure tank as such or arises therein. One then optionally adds to the prepolymer the liquid polybutadiene, e.g. mixed with a surface-active agent and emulsified in a hydroxy oil, for example castor oil. The hydroxy oil or castor oil simultaneously serves to finely adjust the NCO content of the prepolymer and lower the monomer content. Then the additives, such as flameproofing agents, stabilizers, softeners, catalysts, etc., are added, whereupon the pressure tank (aerosol can) is sealed and the propellant impressed.

The invention will be explained by the following compositions.

EXAMPLES 1 and 2

Desmodur 44 V 20 L, a polyisocyanate with 31.6 wt % NCO groups from Bayer, is mixed in a protective atmosphere with the polyol component. The latter consists of Desmophen PU 1578, a polyol with the hydroxyl number 213, caster oil with a hydroxyl number of 155, diphenylcresyl phosphate as a softener and flame-retardant (Disflamoll DPK), a usual polysiloxane for stabilization (Tegostab BF 2270, hydroxyl number 40) and a 10% emulsion of a liquid polybutadiene with a molecular weight of about 3000 and a viscosity at 20° C. of 3000 mPa.s in castor oil (Tego IMR 830 from Goldschmidt; weight ratio polybutadiene/emulsifier 80/20). As a catalyst Texacat DMDEE (2,2-dimorpholinodiethylether) is added.

| Component | Example 1 | Example 2 |
|---|---|---|
| Desmophen PU 1578 | 380 | 380 |
| Disflamoll DPK | 543 | 273 |
| Fyroflex RDP | — | 270 |
| Tegostab BF 2270 | 20 | 20 |
| Tego IMR 830 (10%)* | 50 | 50 |
| Texacat DMDEE | 7 | 7 |
| | | |
| Polyol mixture (parts by weight) | 1000 | 1000 |
| Polyol mixture | 275 g | 275 g |
| Desmodur 44 V 20 L | 385 g | 385 g |
| R 134a | 75 g | 75 g |
| i-butane | 30 g | 30 g |
| Dimethylether | 35 g | 35 g |
| | | |
| Total | 800 g | 800 g |
| Gas fraction (wt %) | 18% | 18% |
| NCO (wt %) | 15.6 | 15.6 |

EXAMPLE 3 to 7

Inventive prepolymer compositions were produced by the following recipes analogously to Examples 1 and 2. The compositions yield a fire-retardant insulating foam with good in-sulating properties.

Desmophen PU 1578 designates a polyester polyol based on phthalic acid/adipic acid with the hydroxyl number 213, Amgard V 82 a phosphorus-modified polyol with the hydroxyl number 110, Unichema VCN 90.243 a hydroxy component with the hydroxyl number 107 based on ethylene glycol adipates and native fatty acids, Sovermol 1068 an aliphatic triglyceride based on soy oil with the hydroxyl number 190, Sovermol 1072 N an aliphatic fat-chemical polyester triol with the hydroxyl number 100, and castor oil one with the hydroxyl number 155. The propellant is the mixture of Examples 1 and 2.

| | Parts by weight | | | | |
|---|---|---|---|---|---|
| Components | 3 | 4 | 5 | 6 | 7 |
| Desmophen PU | 280 | | 200 | 300 | 223 |
| Amgard V 82 | 100 | | | | |
| Desmophen VPPU | | 550 | | 223 | |
| Unichema VCN | | | 200 | | |
| Sovermol 1068 | | | | | 100 |
| Sovermol 1072/V | | | | | 150 |

-continued

| | | | | | |
|---|---|---|---|---|---|
| Castor oil | | | 200 | | |
| Disflamoil | 543 | 373 | 323 | 400 | 450 |
| Tegostab BF 2270 | 20 | 20 | 20 | 20 | 20 |
| Tego IMR 830 (10%) | 50 | 50 | 50 | 50 | 50 |
| Texacat | 7 | 7 | 7 | 7 | 7 |
| Polyol component 3/17 | 1000 | 1000 | 1000 | 1000 | 1000 |
| Polyol component 3/17 | 275 g | 280 g | 280 g | 280 g | 280 g |
| Desmodur 44 V 20 L | 385 g | 380 g | 380 g | 380 g | 380 g |
| Propellant | 140 g | 140 g | 140 g | 140 g | 140 g |
| Total | 800 g | 800 g | 800 g | 800 g | 800 g |
| NCO (wt %) | 15.7 | 16.0 | 14.9 | 15.1 | 15.3 |

| | Parts by weight | | | | |
|---|---|---|---|---|---|
| Component | 8 | 9 | 10 | 11 | 12 |
| Desmophen PU | 300 | 223 | 223 | 300 | 300 |
| Amgard C 82 | | | | | 100 |
| Desmophen VPPU | | 200 | 200 | | |
| APP 200 B | 200 | | | | |
| Prilast 3185 | | | | | 100 |
| Sovermol 1068 | | | 100 | | |
| Castor Oil | | 100 | | 200 | |
| Disflamoil DPK | 423 | | 250 | | |
| TKP | 300 | | | 423 | |
| TPP | | | 423 | | |
| Fyroflex RDP | | 100 | | | |
| Phosflex 362 | | | 150 | | |
| Tegostab BF 2270 | 20 | 20 | 20 | 20 | 20 |
| Tego IMR 830 (10%) | 50 | 50 | 50 | 50 | 50 |
| Texacat DMDEE | 7 | 7 | 7 | 7 | 7 |
| Polyol component 8/12 | 1000 | 1000 | 1000 | 1000 | 1000 |
| Polyol component 8/12 | 275 g | 300 g | 280 g | 280 g | 270 g |
| Desmodur 44 V 20 L | 385 g | 370 g | 380 g | 380 g | 380 g |
| Propellant | 140 g | 140 g | 140 g | 140 g | 140 g |
| Total | 800 g | 810 g | 800 g | 800 g | 790 g |
| NCO (wt %) | 14.9 | 14.3 | 15.1 | 14.9 | 14.5 |

Inventive prepolymer composition were produced by the following recipes analogously to Examples 1 and 2. The Compositions yield a fire-retardant insulating foam with good insulating properties.

The softeners used are diphenylcresyl phosphate (Disflammol DPK), tricresyl phosphate (Disflammol DKP), triphenyl phosphate (20% in DKP, Disflammol TPP), dimethylmethane phosphonate (Amgard DMMP), phosphoric acid-1,3-phenylenetetraphenylester (Fyroflex RDP) and 2-ethylhexyldiphenlphosphate (Phosflex 362). APP 200 B designates an aromatic polyester polyol from Union Carbide, Priplast 3185 a polyhydroxy compound based on ethylene glycol adipate and dimeric fatty acids from Unichema.

| | Parts by weight | | | | |
|---|---|---|---|---|---|
| Component | 13 | 14 | 15 | 16 | 17 |
| Desmophen PU | 300 | 300 | 300 | 300 | 300 |
| Disflammol DPK | 468 | 468 | 468 | 468 | 468 |
| Melamine cyanurate | 150 | | | | 75 |
| Securoc A 5 F | | 150 | 75 | | |
| Cyanodiamide | | | 150 | 150 | |
| Hostaflamm | | | | | |
| Tegostab BF 2270 | 20 | 20 | 20 | 20 | 20 |
| Wetting agent (BYK 160) | 5 | 5 | 5 | 5 | 5 |
| Tego IMR 830 (10%) | 50 | 50 | 50 | 50 | 50 |
| | 7 | 7 | 7 | 7 | 7 |

-continued

| | Parts by weight | | | | |
|---|---|---|---|---|---|
| Component | 13 | 14 | 15 | 16 | 17 |
| Texacat DMDEE | | | | | |
| Polyol component 13/17 | 1000 | 1000 | 1000 | 1000 | 1000 |
| Polyol component 13/17 | 310 g | 310 g | 310 g | 310 g | 310 g |
| Desmodur 44 V 20 L | 360 g | 360 g | 360 g | 360 g | 360 g |
| Propellant | 140 g | 140 g | 140 g | 140 g | 140 g |
| Total | 810 g | 810 g | 810 g | 810 g | 810 g |
| NCO (wt %) | 14.5 | 14.5 | 14.5 | 14.5 | 14.5 |

Inventive prepolymer compositions were produced by the following recipes analogously to Examples 1 and 2. The compositions yield a fire-retardant insulating foam with good insulating properties. Securoc A 5 F designates an aluminum trihydrate and Hostaflamm AP 462 an ammonium polyphosphate in an encapsulated form or functionally modified on the surface. The propellant mixture is the same as in Examples 1 and 2.

With constant stirring the desired quantity of the above-described mixture is put in a moisture-free pressure tank which is sealed with a dome provided with a valve, optionally with introduction of a cartridge having the second component. After sealing, a corresponding quantity of propellant is impressed. The individual components of the propellant mixture are expediently impressed successively and optionally filled up again in a second pass. An especially suitable mixture is of 21.5% i-butane and 28.5% dimethyl-ether and 50% fluorocarbon.

In the following monomer-reduced prepolymer compositions and filling proportions for a pressure tank with a filling ratio of 75% are stated. Both compositions yield an insulating foam with good service properties.

What is claimed is:

1. A prepolymer composition for producing polyurethane insulating foams with fire-retardant properties from aerosol cans, wherein said prepolymer composition comprises:
    a prepolymer component having at least one polyurethane (PU) prepolymer with a content of NCO groups of 4 to 20 wt %
    said prepolymer being prepared from aromatic polyisocyanates and
    polyester-polyols prepared from aromatic polycarboxylic acids and ethylene glycol or glycerol, said polyester polyols having a hydroxyl number between about 100 and 300 and a functionality of 2 to 4 and
    a propellant component selected from the group consisting of propane, butane, fluorocarbons and dimethyl ether, and combinations thereof,
    wherein said prepolymer component is halogen-free and has a content of 5 to 40 wt %, of softening phosphates, phosphonates or combinations thereof having the formulae $O=P(OR)_3$ and $O=P(OR)_2R$, wherein R is the same or different and selected from aralkyl, aryl, or alkylaryl groups having up to 10 carbon atoms, based on the prepolymer content.

2. The prepolymer composition of claim 1, wherein the propellent is a fluorocarbon.

3. The prepolymer composition of claim 2, wherein said prepolymer is prepared from monomers selected from the group consisting of tolylene diisocyanate, and diphenyl-methane diisocyanate.

4. The prepolymer composition of claim 3 wherein softening phosphates and phosphonates are used for setting polyurethane insulating foams to be flame-retardant, the propellant is a fluorocarbon, and the polyester-polyol is prepared from ethylene glycol.

5. The prepolymer composition of claim 1 wherein the polyester polyols are at least partly phosphorous-modified, and the polyester-polyol is prepared from ethylene glycol.

6. The prepolymer composition of claim 1, wherein propellant content is 5 to 40 wt % of the prepolymer composition.

7. The prepolymer composition of claim 1, wherein the propellant component is selected from the group consisting of propane and butane, and the polyester-polyol is prepared from ethylene glycol.

8. The prepolymer composition of claim 1, wherein the propellant component contains fluorocarbon selected from the group consisting of $C_2HF_5$, $C_2H_2F_4$ (unsymmetrical), $C_2H_3F_3$, $C_2H_4F_2$ (unsymmetrical) and mixtures thereof.

9. The prepolymer composition of claim 1, wherein the prepolymer composition additionally contains a flame-retardant additive which is free from chlorine and bromine.

10. The prepolymer composition of claim 9, wherein the flame-retardant additive is selected from the group consisting of melamine, melamine cyanurate, dimelamine phosphate, melamine phosphate, cyanodiamide, dicyanodiamide, aluminum trihydrate, ammonium polyphosphate and mixtures thereof.

11. The prepolymer composition of claim 1, wherein the initial service viscosity of the polyurethane prepolymer at 20° C. is 5000 to 20000 mPa.s.

12. The prepolymer composition of claim, 1 wherein the initial service viscosity of the polyurethane prepolymer is between 8000 to 15000 mPa.s. at 20° C.

* * * * *